United States Patent
Zhang et al.

(10) Patent No.: US 10,345,632 B2
(45) Date of Patent: Jul. 9, 2019

(54) WORKTABLE FOR LIQUID CRYSTAL PANEL TEST, AND LIQUID CRYSTAL PANEL TEST APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Ji Zhang, Beijing (CN); Zheng Bian, Beijing (CN); Dongsheng Xu, Beijing (CN); Yongyong Zhang, Beijing (CN); Yujia Wang, Beijing (CN); Chong Guo, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/789,697

(22) Filed: Oct. 20, 2017

(65) Prior Publication Data

US 2018/0267343 A1 Sep. 20, 2018

(30) Foreign Application Priority Data

Mar. 20, 2017 (CN) .......................... 2017 1 0166476

(51) Int. Cl.
*G02F 1/13* (2006.01)
*G02F 1/1339* (2006.01)

(52) U.S. Cl.
CPC .......... *G02F 1/1309* (2013.01); *G02F 1/1303* (2013.01); *G02F 1/1339* (2013.01); *G02F 2201/46* (2013.01)

(58) Field of Classification Search
CPC .... G02F 1/1309; G02F 1/1303; G02F 1/1339; G02F 2201/46
See application file for complete search history.

(56) References Cited

U.S. PATENT DOCUMENTS 6,359,686 B1 * 3/2002 Ariglio .............. G01N 21/8901
356/239.1
7,889,311 B2 * 2/2011 Lee ....................... G02F 1/1303
324/760.01

(Continued)

FOREIGN PATENT DOCUMENTS

CN 201097045 Y 8/2008
CN 204557005 U 8/2015

(Continued)

OTHER PUBLICATIONS

First Chinese Office Action dated May 17, 2019, received for corresponding Chinese Application No. 201710166476.6.

*Primary Examiner* — Tracie Y Green
(74) *Attorney, Agent, or Firm* — Kinney & Lange, P.A.

(57) ABSTRACT

The present disclosure provides a worktable for testing a liquid crystal panel. In one embodiment, the worktable for testing the liquid crystal panel includes: a table body, an upper surface of which being formed with a mounting groove in order to form a light-transmittance region; wherein, the table body is further formed with a slot that has an opening in a side surface of the table body and that is configured to mount a lower polarizer therein so that the lower polarizer at least covers the light-transmittance region. The present disclosure also provides a test apparatus including the mentioned worktable.

18 Claims, 4 Drawing Sheets

(56) References Cited

U.S. PATENT DOCUMENTS

| | | | | |
|---|---|---|---|---|
| 8,836,940 B2* | 9/2014 | Huang | ............... | G02F 1/1309 |
| | | | | 356/138 |
| 2007/0046321 A1* | 3/2007 | Kang | ............... | G02F 1/1309 |
| | | | | 324/760.01 |
| 2016/0161795 A1* | 6/2016 | Lee | ............... | B05B 12/20 |
| | | | | 427/163.1 |

FOREIGN PATENT DOCUMENTS

| CN | 205049832 U | 2/2016 |
|---|---|---|
| CN | 106353901 A | 1/2017 |

\* cited by examiner

WORKTABLE FOR LIQUID CRYSTAL PANEL TEST, AND LIQUID CRYSTAL PANEL TEST APPARATUS

CROSS-REFERENCE TO RELATED APPLICATION

This application claims priority to Chinese Patent Application No. 201710166476.6 filed on Mar. 20, 2017 in the State Intellectual Property Office of China, the disclosures of which are hereby incorporated by reference in their entirety.

TECHNICAL FIELD

The present disclosure relates to the technical field of liquid crystal panel test, and particularly, to a worktable for testing a liquid crystal panel, and a test apparatus for testing a liquid crystal panel.

BACKGROUND

Liquid crystal panel test (also named as Cell Test), in which a light passes through a lower polarizer, a liquid crystal cell and an upper polarizer of a liquid crystal panel sequentially to test optical performance of the liquid crystal panel, should be implemented in production of a liquid crystal display, in order to exclude defective product. In a liquid crystal panel test implemented by conventional liquid crystal panel test apparatus, light leakage phenomenon occurs at an edge of the lower polarizer, which adversely affects checking of defective margin of the liquid crystal panel.

SUMMARY

In one aspect, according to embodiments of the present disclosure, there is provided a worktable for testing a liquid crystal panel, the worktable comprising: a table body, an upper surface of which being formed with a mounting groove in order to form a light-transmittance region; wherein, the table body is further formed with a slot that has an opening in a side surface of the table body and that is configured to mount a lower polarizer of the liquid crystal panel therein so that the lower polarizer at least covers the light-transmittance region.

In some embodiments, the table body is further provided with a fixing mechanism configured for fixing the lower polarizer.

In some embodiments, the fixing mechanism comprises: at least two pinholes distributed in the upper surface around the opening of the slot, and pin bolts provided in and threadedly engaged with the pinholes and configured to limit an edge of the lower polarizer.

In some embodiments, the fixing mechanism comprises: a sealing strip detachably mounted to the opening of the slot, wherein the sealing strip includes a protrusion configured to be embedded into the opening of the slot so as to limit an edge of the lower polarizer.

In some embodiments, a plurality of air holes are formed in the upper surface of the table body around an opening of the mounting groove, and the plurality of air holes are configured for connection to a vacuum source, to generate a negative pressure for fixing the liquid crystal panel by adsorption.

In some embodiments, the table body further comprises a clamping roller and an auxiliary roller provided respectively at opposing edges of the upper surface of the table body, the auxiliary roller is configured to bear against a side edge of the liquid crystal panel, and the clamping roller is connected to a driving mechanism and is able to be driven by the driving mechanism to push an opposing side edge of the liquid crystal panel, so that the clamping roller and the auxiliary roller cooperate to clamp the liquid crystal panel therebetween.

In some embodiments, the auxiliary roller is provided at a head of the pin bolt.

In some embodiments, the driving mechanism comprises: a base, a driving piece, and two driving air paths configured for connection to an air source; the driving piece is provided on a sliding rail provided on an upper surface of the base and is connected with the clamping roller through a connection bar; the base defines an inner chamber therein, and a piston is connected with the driving piece and is provided in the inner chamber to divide the inner chamber into two chamber sections which are respectively communicated to the two driving air paths.

In some embodiments, the connection bar is provided on an upper surface of the driving piece.

In some embodiments, a coverage area of the slot is greater than an area of the opening of the mounting groove.

In another aspect, according to embodiments of the present disclosure, there is further provided a test apparatus for testing a liquid crystal panel, the test apparatus comprises the worktable according to any of the above embodiments.

BRIEF DESCRIPTION OF THE DRAWINGS

In order to provide a more clear explanation of embodiments of the present disclosure or prior art solutions, there is provided a brief introduction of the attached drawings used in the following description of the embodiments and the prior art solutions. Obviously, the drawings mentioned in the following description belong to some embodiments of the present disclosure. However, for those skilled in the art, other drawings may be achieved on the basis of these attached drawings without involving any inventive steps.

DETAILED DESCRIPTION OF THE EMBODIMENTS

In order to provide a more clear understanding of objects, technique solutions and advantages of embodiments of the present disclosure, the embodiments of the present disclosure will be further described hereinafter in detail and completely with reference to the attached drawings.

It should be noted that in the description, orientations or positional relationships denoted by terminologies "upper", "lower", "left", "right", "top", "bottom", "interior", "exterior" and the likes are those shown in the figures, and only intended for easing or simplifying the description of embodiments of the present disclosure, instead of expressing or implying that the devices or elements should be located at specific orientations or should be configured or manipulated at specific orientations, accordingly, they are not intended to limit the scope of the present disclosure.

Figure 1:
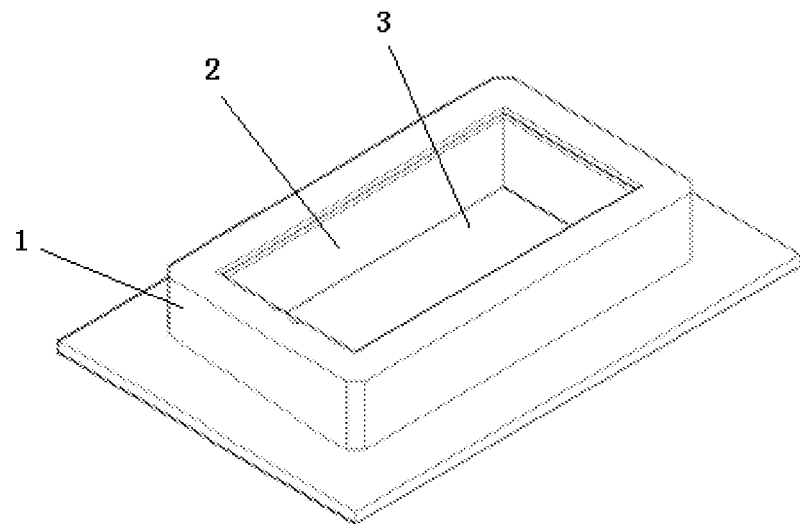
FIG. 1 is a schematic view showing a structure of a conventional worktable.

At least one object of embodiments of the present disclosure aims to solve a technical problem that a light leakage phenomenon occurs at an edge of the lower polarizer of a conventional liquid crystal panel test apparatus when the apparatus performs a liquid crystal panel test. Referring to FIG. 1, FIG. 1 shows a structure of a conventional worktable.

Conventional liquid crystal panel test apparatus includes one worktable, and the worktable comprises a table body 1, and a mounting groove 2 formed in an upper surface of the table body 1 and provided, at its bottom, with a backlight source in order to form a light-transmittance region 3. The table body 1 is in the shape of a rectangular parallelopiped. The mounting groove 2 is formed in the middle of the upper surface of the table body 1. The backlight source is provided at the bottom of the mounting groove 2. Light emitted by the backlight source exits along the mounting groove 2. Obviously, an area of an opening of the mounting groove 2 is namely a light outgoing area of the light-transmittance region 3. In a test, firstly a lower polarizer is placed horizontally into the mounting groove 2. Then, a liquid crystal panel is placed at and is pressed against the opening of the mounting groove 2. Finally, an upper polarizer is placed on an upper surface of the liquid crystal panel. Thus it can be seen, in the structure of the conventional worktable, placing of the lower polarizer into the mounting groove 2 horizontally from the opening of the mounting groove 2 requires that an area of the lower polarizer is less than an area of the light-transmittance region 3, so that there has a gap between an edge of the lower polarizer and an edge of the light-transmittance region 3. Some lights emitted by the backlight source go through the gap directly instead of passing through the lower polarizer, which causes a light leakage phenomenon occurred at a margin of the liquid crystal panel, adversely affecting checkout of the defective margin of the liquid crystal panel.

Figure 2:
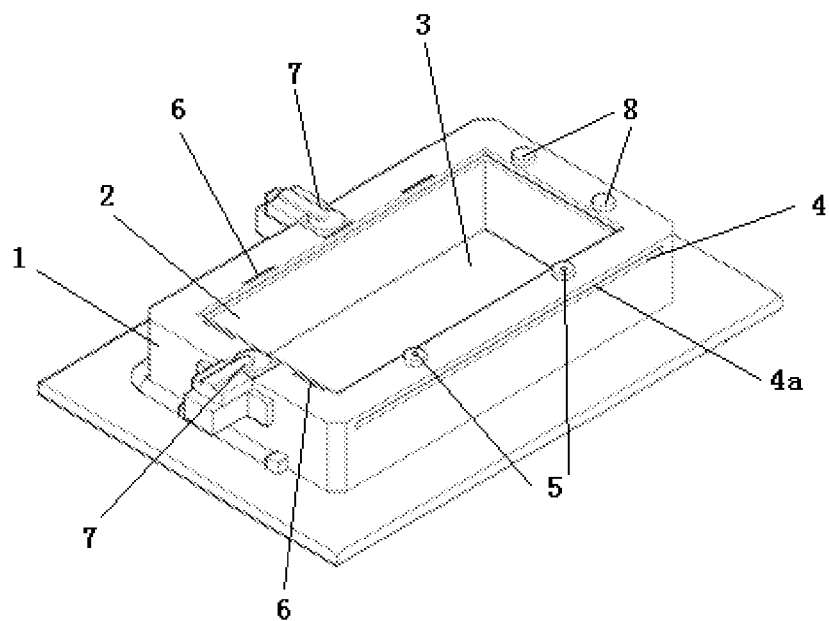
FIG. 2 is a schematic view showing a structure of a worktable according to an embodiment of the present disclosure.

A worktable for testing a liquid crystal panel is provided according to embodiments of the present disclosure. Referring to FIG. 2, FIG. 2 shows a structure of a worktable according to an embodiment of the present disclosure.

A worktable for testing a liquid crystal panel includes a table body 1, and, a mounting groove 2 is formed in an upper surface of the table body 1 and is provided, at its bottom, with a backlight source in order to form a light-transmittance region 3. The table body 1 is further formed with a slot 4 that has an opening 4a in a side surface of the table body 1 and that is configured to mount a lower polarizer therein so that the lower polarizer at least covers the light-transmittance region 3.

Figure 3:
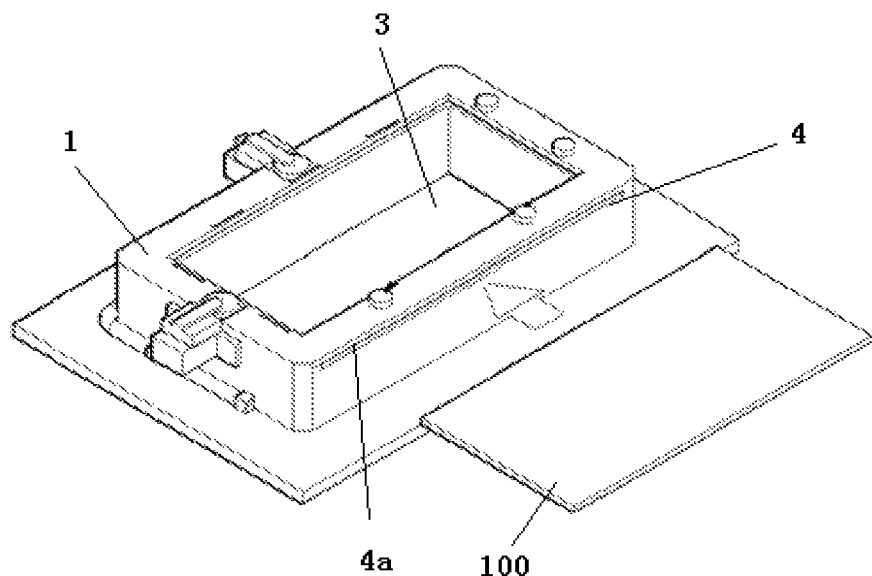
FIG. 3 is a schematic view showing use process of a worktable according to the embodiment of the present disclosure.

When a liquid crystal panel test is implemented by using the worktable according to the present embodiment, referring to FIG. 3, the lower polarizer 100 is inserted into the slot 4 from the side surface of the table body 1. Size of the slot 4 is suitable for size of the lower polarizer 100, while coverage area of the slot 4 is greater than an area of an opening of the mounting groove 2 which is namely a light outgoing area of the light-transmittance region 3. With provision of the abovementioned slot 4, the lower polarizer 100 can completely cover the light-transmittance region 3 after being inserted into the slot 4, so that all the lights emitted by the backlight source can pass through the lower polarizer 100 after exiting through the light-transmittance region 3, which eliminates the problem that a light leakage phenomenon occurs at the margin when the conventional worktable performs a test, increasing degree of accuracy of the liquid crystal panel test.

In the present embodiment, the table body 1 is further provided with a fixing mechanism configured for fixing the lower polarizer. When a liquid crystal panel test is implementing, the lower polarizer is stably fixed within the slot by the fixing mechanism, which can prevent the lower polarizer from being separated from the table body due to movement of the worktable.

Figure 4:
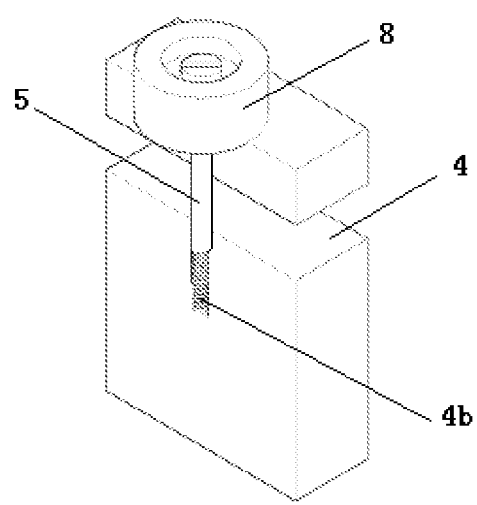
FIG. 4 is a schematic view showing a structure of a fixing mechanism according to the embodiment of the present disclosure.

Specifically, referring to FIG. 2 and FIG. 4, the fixing mechanism comprises: at least two pinholes 4b distributed uniformly in the upper surface around the opening 4a of the slot 4, and pin bolts 5 provided in and threadedly engaged with the pinholes 4b and configured to limit an edge of the lower polarizer when the pin bolts 5 are mounted into the pinholes 4b, in order for achieving technical effect that the lower polarizer is stably fixed. When the pin bolt 5 is taken out from the pinhole, the lower polarizer can be inserted into or be taken out from the slot 4. When a test is implementing, sometimes the table body requires to be rotated or to be inclined, however, provision of the fixing mechanism according to the present embodiment can fix simply and quickly the lower polarizer within the slot 4, preventing the lower polarizer from being separated from the table body. In the present embodiment, two pin bolts 5 are provided. Obviously, more pin bolts 5 may be provided in accordance with requirements on practical stability of the fixing and practical specifications on the worktable, as long as technical effect that the lower polarizer is stably fixed can be achieved.

Moreover, in the present embodiment, referring to FIG. 2, a plurality of air holes 6, which are connected to a vacuum source through adsorption air paths, are uniformly formed in the upper surface of the table body 1 around an opening of the mounting groove 2. When a test is implementing, the liquid crystal panel is placed on the upper surface of the table body 1, and the liquid crystal panel is required to be fixed without any movement. The liquid crystal panel can be fixed by the air holes 6 according to the present embodiment. Specifically, the air holes 6 are connected to the vacuum source through the adsorption air paths. The vacuum source works, and negative pressure is generated at the air holes 6 through the adsorption air paths. The plurality of air holes 6 formed uniformly in the upper surface of the table body 1 around the opening of the mounting groove 2 performs adsorption on a lower surface of the liquid crystal panel by the negative pressure, to stably fix the liquid crystal panel to the upper surface of the table body 1 by adsorption. The number of the air holes 6 is not limited in the present embodiment, and, it can be freely determined in accordance with practical application requirements, as long as technical effect that the liquid crystal panel is stably fixed by adsorption can be achieved.

Moreover, in the present embodiment, referring to FIG. 2, a clamping roller 7 and an auxiliary roller 8 are provided respectively at opposing edges of the upper surface of the table body 1. The clamping roller 7 and the auxiliary roller 8 are configured to cooperate with each other to clamp the liquid crystal panel at edges thereof, so as to further increase degree of a stable fixing of the liquid crystal panel onto the upper surface of the table body 1.

Specifically, the auxiliary roller 8 is fixed at an edge of the upper surface of the table body 1, and the clamping roller 7 cooperated with the auxiliary roller 8 is provided at an edge of the upper surface of table body 1 opposing to the auxiliary roller 8. Meanwhile, the clamping roller 7 is connected to a driving mechanism 8, and is able to stretch out toward or draw back from the auxiliary roller 8 horizontally by being driven by the driving mechanism. When a test is implementing, the liquid crystal panel is placed on the upper surface of the table body 1, so that the auxiliary roller 8 bears against a side edge of the liquid crystal panel, then the driving mechanism operates to drive the clamping roller 7 to stretch out horizontally toward the auxiliary roller 8 so as to push an opposing side edge of the liquid crystal panel. Since position of the auxiliary roller 8 is immobile, the liquid crystal panel is clamped by interaction force between the clamping roller 7 and the auxiliary roller 8, increasing degree of stable fixing of the liquid crystal panel.

Figure 5:
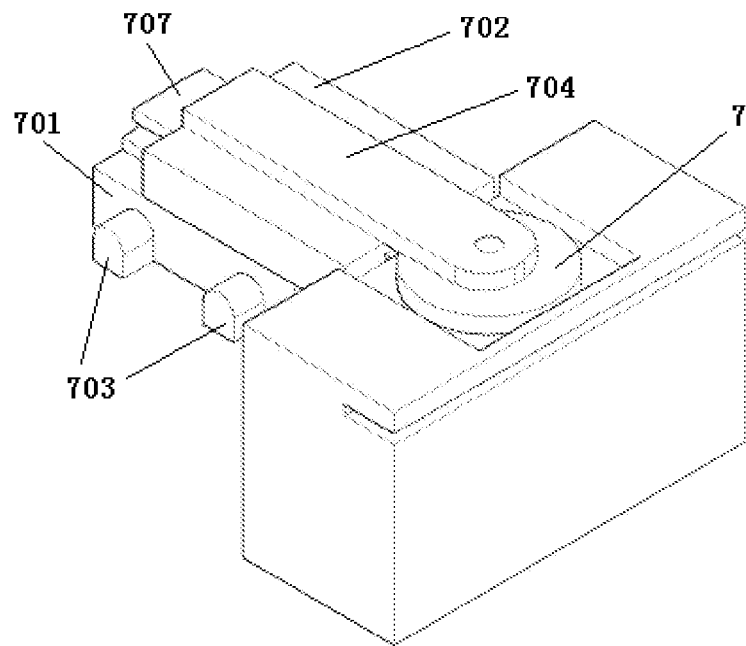
FIG. 5 is a schematic view showing a structure of a driving mechanism according to the embodiment of the present disclosure.
Figure 6:
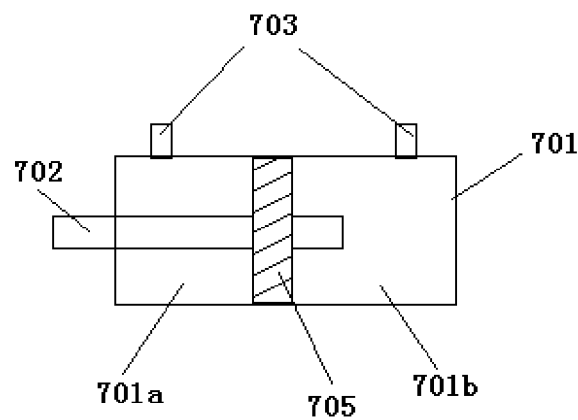
FIG. 6 is a schematic view showing a structure of a base of the driving mechanism according to the embodiment of the present disclosure.

In the present embodiment, referring to FIG. 5, the driving mechanism comprises: a base 701, a driving piece 702, and two driving air paths 703 configured for connections to an air source. The driving piece 702 is provided on a sliding rail 707 provided on an upper surface of the base 701, and the driving piece 702 is connected with the clamping roller 7 through a connection bar 704. Referring to FIG. 5 and FIG. 6, the base 701 defines an inner chamber therein, and a piston 705 is connected with the driving piece 702, and the piston 705 is provided in the inner chamber to divide the inner chamber into two chamber sections 701a and 701b which are respectively communicated to the two driving air paths 703. Specifically, the driving piece 702 can move along the sliding rail 707 provided on the upper surface of the base 701, and, the sliding rail 707 extends towards the auxiliary roller 8, so that the clamping roller 7 stretches out horizontally toward the auxiliary roller 8. Referring to FIG. 6, assumes that the auxiliary roller 8 is positioned on the left side in FIG. 6, when it requires to stretch out the clamping roller 7 for clamping the liquid crystal panel, right driving air path 703 operates so that air generated from the air source gradually fills into the right chamber section 701b of the base 701 through the right driving air path 703 to push the piston 705 to move leftward, then, the driving piece 702 is driven by leftward movement of the piston 705 to drive the clamping roller 7 through the connection bar 704 to move leftward (toward the auxiliary roller 8), thereby achieving stretching out of the clamping roller 7 toward the auxiliary roller 8. Conversely, the left driving air path 703 operates so that air generated from the air source gradually fills into the left chamber section 701a of the base 701 through the left driving air path 703 to push the piston 705 to move rightward, then, the driving piece 702 is driven by rightward movement of the piston 705 to drive the clamping roller 7 through the connection bar 704 to move rightward (away from the auxiliary roller 8), so that the clamping of the liquid crystal panel between the clamping roller 7 and the auxiliary roller 8 is released, and the liquid crystal panel can be taken out.

In the present embodiment, referring to FIG. 5, the connection bar 704 is provided on an upper surface of the driving piece 702. Provision of the connection bar 704 on the upper surface of the driving piece 702 enables the connection bar 704 to not occupy interior space of the table body, so as to, when a test is implementing, ensure a spacing between the lower polarizer and the liquid crystal panel is small enough, increasing degree of accuracy of the test.

In the present embodiment, referring to FIG. 2, since the opening of the slot 4 is located in the side surface of the table body 1, a head of the pin bolt 5 at the opening of the slot 4 is located at an edge of the upper surface of the table body 1. Correspondingly, referring to FIG. 4, the auxiliary roller 8 is provided at the head of the pin bolt 5, so that a space occupied by the pin bolt 5 is sufficiently utilized and no exclusive space requires to be prepared for the auxiliary roller 8, effectively improving coefficient of utilization of space of the upper surface of the table body 1 and thus achieving compact and reasonable structure of the worktable according to the present embodiment.

Figure 7:
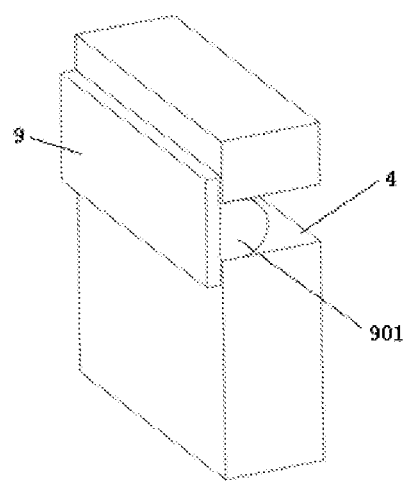
FIG. 7 is a schematic view showing a structure of a fixing mechanism according to another embodiment of the present disclosure.

In an alternative embodiment, referring to FIG. 7, the fixing mechanism configured for fixing the lower polarizer comprises: a sealing strip 9 detachably mounted to the opening 4a of the slot 4. The sealing strip 9 includes a protrusion 901 configured to engage with the opening 4a of the slot 4. When the sealing strip 9 is fixed on the slot 4, the protrusion 901 is embedded into the opening 4a of the slot 4, to limit an edge of the lower polarizer mounted within the slot 4, achieving technical effect that the lower polarizer is stably fixed. The sealing strip 9 may be detachably mounted to the slot 4 through screws, joints or other detachable connectors, provided at both ends of the sealing strip 9 in its length direction. The detachable connector adopted for the sealing strip 9 may be freely selected in accordance with practical application requirements, and is not limited specifically in embodiments of the present disclosure.

In another aspect, a test apparatus for testing a liquid crystal panel is provided according to embodiments of the present disclosure, and the test apparatus includes the worktable of any one of the above embodiments.

Besides the mentioned worktable, the test apparatus for testing the liquid crystal panel also includes other common assemblies for the liquid crystal panel test, such as an air source, a power supply, electronics having data storage function and processing function, and the like. For the brevity of clarity, descriptions of these common assemblies are omitted.

From the above embodiments, it can be seen that, in the worktable for testing the liquid crystal panel and the test apparatus for testing the liquid crystal panel according to the present disclosure, provision of the slot configured for mounting the lower polarizer, on the worktable enables that, when a test is implementing, the lower polarizer is no longer to be placed into the table body from the upper surface of the table body, but will be inserted into the slot of the table body from the side surface of the table body. After mounting of the lower polarizer within the slot, the lower polarizer completely covers the light-transmittance region, in this way, all the lights emitted by the backlight source can pass through the lower polarizer, which eliminates the problem that a light leakage phenomenon occurs at the margin when the conventional worktable performs a test, increasing degree of accuracy of the liquid crystal panel test.

The above description is merely used to illustrate specific embodiments of the present disclosure, but not to limit the present disclosure. Although a detailed description of embodiments of the present disclosure with reference to the attached drawings is provided, it should be understood by those skilled in the art that, all of changes, alternatives, and modifications, made within principles and spirit of the present disclosure, should be included within the scope of the present disclosure. Accordingly, the scope of the present disclosure is defined by the claims and their equivalents.

What is claimed is:

1. A worktable for testing a liquid crystal panel, the worktable comprising:
a table body, an upper surface of which being formed with a mounting groove in order to form a light-transmittance region;
wherein, the table body is further formed with a slot that has an opening in a side surface of the table body and that is configured to mount a lower polarizer of the liquid crystal panel therein so that the lower polarizer at least covers the light-transmittance region; wherein the table body further comprises a clamping roller and an auxiliary roller provided respectively at opposing edges of the upper surface thereof, the auxiliary roller is configured to bear against a side edge of the liquid crystal panel, and the clamping roller is connected to a driving mechanism and is able to be driven by the driving mechanism to push an opposing side edge of the liquid crystal panel, so that the clamping roller and the auxiliary roller cooperate to clamp the liquid crystal panel therebetween.

2. The worktable of claim 1, wherein the table body is further provided with a fixing mechanism configured for fixing the lower polarizer.

3. The worktable of claim 2, wherein the fixing mechanism comprises: at least two pinholes distributed in the upper surface around the opening of the slot, and pin bolts provided in and threadedly engaged with the pinholes and configured to limit an edge of the lower polarizer.

4. The worktable of claim 2, wherein the fixing mechanism comprises: a sealing strip detachably mounted to the opening of the slot, wherein the sealing strip includes a protrusion, and the protrusion is configured to be embedded into the opening of the slot so as to limit an edge of the lower polarizer.

5. The worktable of claim 1, wherein a plurality of air holes are formed in the upper surface of the table body around an opening of the mounting groove, and the plurality of air holes are configured for connection to a vacuum source, to generate a negative pressure for fixing the liquid crystal panel by adsorption.

6. The worktable of claim 1, wherein the auxiliary roller is provided at a head of the pin bolts.

7. The worktable of claim 1, wherein the driving mechanism comprises: a base, a driving piece, and two driving air paths configured for connection to an air source; the driving piece is provided on a sliding rail provided on an upper surface of the base and is connected with the clamping roller through a connection bar; the base defines an inner chamber therein, and a piston is connected with the driving piece and is provided in the inner chamber to divide the inner chamber into two chamber sections which are respectively communicated to the two driving air paths.

8. The worktable of claim 7, wherein the connection bar is provided on an upper surface of the driving piece.

9. The worktable of claim 1, wherein a coverage area of the slot is greater than an area of the opening of the mounting groove.

10. A test apparatus for testing a liquid crystal panel, the test apparatus comprising the worktable of claim 1.

11. The test apparatus of claim 10, wherein the table body is further provided with a fixing mechanism configured for fixing the lower polarizer.

12. The test apparatus of claim 11, wherein the fixing mechanism comprises: at least two pinholes distributed in the upper surface around the opening of the slot, and pin bolts provided in and threadedly engaged with the pinholes and configured to limit an edge of the lower polarizer.

13. The test apparatus of claim 11, wherein the fixing mechanism comprises: a sealing strip detachably mounted to the opening of the slot and including a protrusion configured to be embedded into the opening of the slot so as to limit an edge of the lower polarizer.

14. The test apparatus of claim 10, wherein a plurality of air holes are formed in the upper surface of the table body around the opening of the mounting groove, and are configured for connection to a vacuum source through an adsorption air path, to generate a negative pressure for fixing the liquid crystal panel by adsorption.

15. The test apparatus of claim 10, wherein the auxiliary roller is provided at a head of the pin bolts.

16. The test apparatus of claim 10, wherein the driving mechanism comprises: a base, a driving piece, and two driving air paths configured for connection to the air source; the driving piece is provided on a sliding rail provided on an upper surface of the base and is connected with the clamping roller through a connection bar; the base defines an inner chamber therein, and a piston is connected with the driving piece and is provided in the inner chamber to divide the inner chamber into two chamber sections which are respectively communicated to the two driving air paths.

17. The test apparatus of claim 16, wherein the connection bar is provided on an upper surface of the driving piece.

18. The test apparatus of claim 10, wherein a coverage area of the slot is greater than an area of the opening of the mounting groove.

* * * * *